(12) United States Patent  (10) Patent No.: US 8,794,565 B2
Botich  (45) Date of Patent: Aug. 5, 2014

(54) HELICOPTER TORQUE COUNTERACTION DEVICE

(71) Applicant: Helicopter Innovations, Inc., Monee, IL (US)

(72) Inventor: Leon A. Botich, Monee, IL (US)

(73) Assignee: Helicopter Innovations, Inc., Monee, IL (US)

( * ) Notice: Subject to any disclaimer, the term of this patent is extended or adjusted under 35 U.S.C. 154(b) by 0 days.

(21) Appl. No.: 13/872,802

(22) Filed: Apr. 29, 2013

(65) Prior Publication Data

US 2013/0233965 A1 Sep. 12, 2013

Related U.S. Application Data

(63) Continuation of application No. 13/463,400, filed on May 3, 2012, now Pat. No. 8,430,353, which is a continuation of application No. 12/187,494, filed on Aug. 7, 2008, now Pat. No. 8,231,077.

(51) Int. Cl.
*B64C 27/82* (2006.01)

(52) U.S. Cl.
USPC ...................................... 244/17.19

(58) Field of Classification Search
USPC ................. 244/17.19, 17.11, 17.21, 17.13
See application file for complete search history.

(56) References Cited

U.S. PATENT DOCUMENTS

| | | | |
|---|---|---|---|
| 3,081,966 A | 3/1963 | Avery | |
| 3,096,953 A * | 7/1963 | Koump | 244/17.19 |
| 3,105,659 A | 10/1963 | Stutz | |
| 3,188,884 A | 6/1965 | Bancroft | |
| 4,462,559 A | 7/1984 | Garza | |
| 4,708,305 A | 11/1987 | Kelley et al. | |
| 4,928,907 A * | 5/1990 | Zuck | 244/6 |
| 5,188,511 A | 2/1993 | Ebert | |
| 5,209,430 A * | 5/1993 | Wilson et al. | 244/17.19 |
| 5,388,785 A | 2/1995 | Rollet et al. | |
| 5,437,419 A * | 8/1995 | Schmitz | 244/17.11 |
| 5,454,530 A | 10/1995 | Rutherford et al. | |
| 6,036,141 A * | 3/2000 | Clay | 244/17.19 |
| 6,352,220 B1 * | 3/2002 | Banks et al. | 244/17.19 |

(Continued)

FOREIGN PATENT DOCUMENTS

| | | |
|---|---|---|
| EP | 1787907 A2 | 5/2007 |
| GB | 2249770 A | 5/1992 |
| JP | 6286696 | 10/1994 |
| WO | WO-2006036147 A1 | 4/2006 |

OTHER PUBLICATIONS

Civil Aviation Authority CAA Paper 2003/1, "Helicopter Tail Rotor Failures", Dated Nov. 2003, 255 pgs.
PCT Application No. PCT/US09/53012 International Search Report and Written Opinion dated Oct. 5, 2009, 7 pgs.

(Continued)

*Primary Examiner* — Philip J Bonzell
(74) *Attorney, Agent, or Firm* — Marshall, Gerstein & Borun LLP; Thomas J. Ring

(57) ABSTRACT

The torque resisting system for a helicopter which includes a body. Main rotor and a tail rotor, the system includes a deflector connected to an actuator for moving the deflector relative to the body. The system further includes a sensor that is operationally associated with the tail rotor and the actuator, such that the actuator moves the deflector upon: receiving a signal indicating that the tail rotor is operating below a predetermined rotation or a determination that the sensor is inoperable or absent.

2 Claims, 4 Drawing Sheets

(56) References Cited

U.S. PATENT DOCUMENTS

| | | |
|---|---|---|
| 6,416,015 B1 | 7/2002 | Carson |
| 6,755,374 B1 * | 6/2004 | Carson ........................ 244/17.19 |
| 6,885,917 B2 | 4/2005 | Osder et al. |
| 7,032,860 B1 * | 4/2006 | Kirk et al. ................... 244/17.19 |
| RE42,446 E * | 6/2011 | Kirk et al. ................... 244/17.19 |
| 2009/0277991 A1 * | 11/2009 | Mikulla ..................... 244/17.21 |

OTHER PUBLICATIONS

Office Action dated Sep. 29, 2011 for U.S. Appl. 12/187,494, 9 pages.

Office Action dated Aug. 24, 2012 for U.S. Appl. No. 13/463,400, 8 pages.

Final Office Action dated Nov. 30, 2012 for U.S. Appl. No. 13/463,400, 6 pages.

\* cited by examiner

HELICOPTER TORQUE COUNTERACTION DEVICE

CROSS REFERENCE TO RELATED APPLICATION

This application is a continuation of U.S. patent application Ser. No. 13/463,400 filed May 3, 2012 which is a continuation of U.S. Pat. No. 8,231,077 issued Jul. 31, 2012.

FIELD OF INVENTION

The present invention relates to helicopters and more particularly to helicopters utilizing a main rotor, and a tail rotor for countering the torque created by the main rotor thereby controlling the lateral movement of the helicopter.

BACKGROUND

Most helicopters have a single, main rotor but these helicopters also require a separate rotor to overcome torque generated by the main rotor. The single, main rotor blades are generally oriented to rotate in a horizontal plane and the separate rotor blades, often positioned in the tail of the craft, are generally oriented to rotate in a vertical plane.

The single main rotor of a helicopter, as the engine rotates it, creates a counter-torque. The torque causes the body of the helicopter to turn or rotate in the opposite direction that the rotor rotates. The tail rotor, provided with variable pitched blades, through its rotation, either pushes or pulls against the tail to counter the torque imparted by the main rotor to the body of the helicopter.

If the tail rotor fails in flight, engine torque can no longer be countered by the tail rotor, and uncontrolled spinning of the aircraft, driven by the torque generated by the main rotor rotation, is a common result. The pilot has to identify and diagnose the type of tail rotor failure and react accordingly with the correct control strategy within a few seconds to prevent the helicopter from reaching an uncontrollable flight state. There is a need for a device that can automatically provide sufficient torque counter-action upon the loss or failure of a tail rotor to increase the amount of time a pilot has to react to the tail rotor failure thereby increasing the pilot's chances of ultimately safely landing the helicopter. There is also need for a device that can provide sufficient torque counter-action upon the loss or failure of a tail rotor to provide enough directional stability at normal cruising speeds so that a pilot can continue on course or maintain altitude until a suitable landing area is reached.

SUMMARY

A torque resisting device for a helicopter wherein the helicopter has a body, a main rotor and a tail rotor comprising a deflector secured to and movable relative to the body, wherein the deflector is positioned between the main rotor and the tail rotor and wherein the deflector is positioned generally aligned with the body in a non-deployed position and a portion of the deflector is positioned spaced apart from the body in a deployed position.

A method for counteracting torque in the operation of a helicopter having a main rotor and a tail rotor following the failure of the tail rotor comprising the steps of providing a deflector secured to the helicopter in a position between the main rotor and the tail rotor, wherein the deflector is positioned generally aligned with a body of the helicopter and deployable to another position wherein a portion of the deflector is positioned spaced apart from the body, deploying the deflector to the other position with occurrence of rotational movement of the body of the helicopter resulting from torque imparted to the body from the rotation of the main rotor.

DETAILED DESCRIPTION

Figure 1:
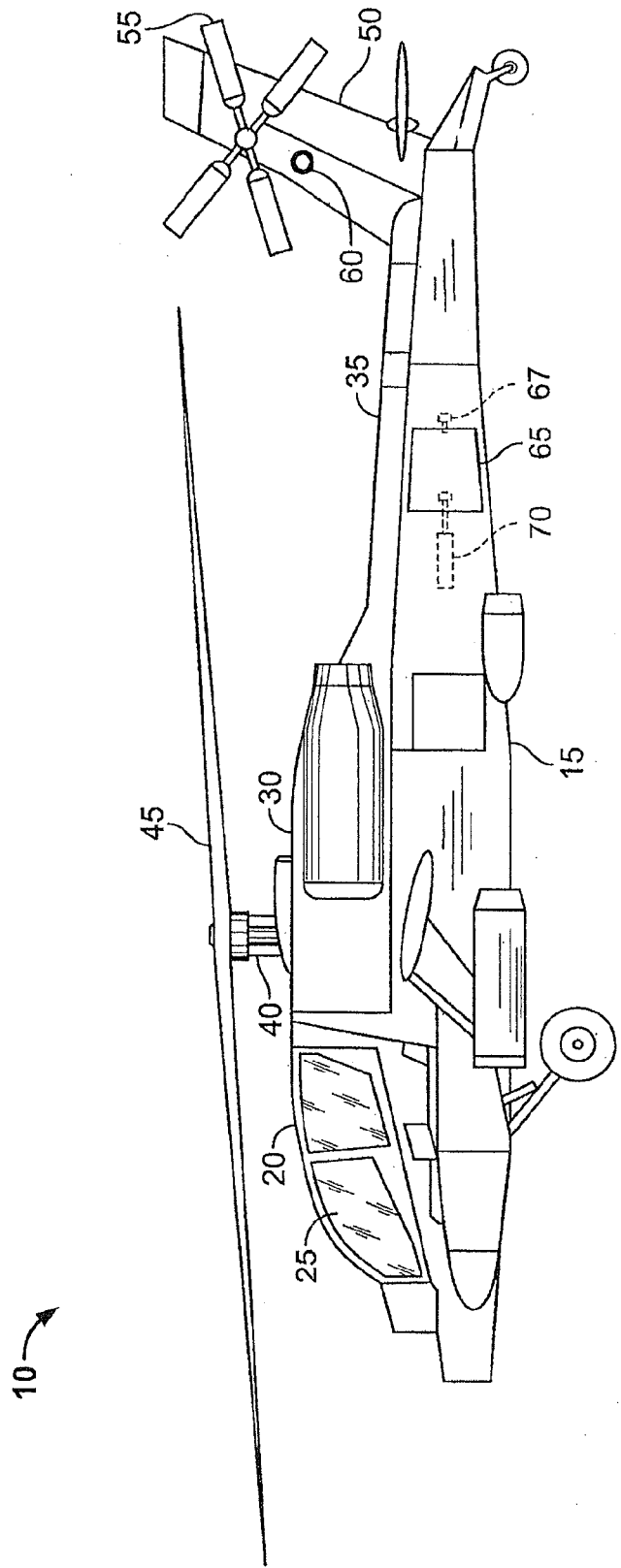
FIG. 1 is a side elevational view of an example of a helicopter.

FIG. 1 illustrates an example of a helicopter, generally designated 10. In this example, helicopter 10 includes a fuselage 15 having a front portion 20 with a cockpit 25, an intermediate portion 30 and a tail portion 35. A rotary shaft 40 extends upward from the intermediate portion 30 and main rotor 45 is generally horizontally mounted on the rotary shaft 40. The end of the tail portion 35 includes a tail fin 50 which extends generally in a vertical direction from tail portion 35. In this example, the tail rotor 55 is mounted on the tail fin 50 and rotates in a plane generally perpendicular to main rotor 45. It is understood, however, that tail rotor 55 may also be mounted directly in the tail portion 35. Both the main rotor 45 and the tail rotor 55 are driven by an engine of the helicopter 10 through a common transmission and rotate at a certain ratio to each other. For example, the tail rotor 55 may rotate five times for every one time the main rotor 45 rotates. As the engine of the helicopter 10 rotates the main rotor 45 in one direction, torque is created causing the fuselage 15 to rotate in the opposite direction. The rotation of the tail rotor 55 creates a thrust that counteracts the torque that the main rotor 45 produces thereby allowing the helicopter 10 to maintain its heading and provide yaw control.

Yaw is controlled by changing the pitch of the tail rotor 55, thereby controlling thrust. The pitch of tail rotor 55 is controlled by right and left rudder pedals schematic representation of these pedals can be seen in FIG. 4. To turn the nose of the helicopter right, for example, depressing the right rudder pedal decreases the pitch of the tail rotor 55 thereby reducing thrust and the torque then turns the helicopter nose right. Depressing the left rudder pedal increases the pitch of the tail rotor 55 thereby increasing thrust and turning the nose of the helicopter left. A balanced performance between main rotor 45 and tail rotor 55 at normal flight would generally be a neutral position of the right and left rudder pedals. The RPM's of the main rotor 45 and the tail rotor 55 are fairly constant. For instance, if the main rotor 45 is operating at 300 RPM, then the tail rotor is operating at approximately 1500 RPM. There may be a slight variation in the ratio at which the two rotors operate, up to five percent. Undesirable performance of tail rotor 55 would be any drop in RPM's in relationship to the RPM's of the main rotor 45 outside of that five percent variation.

A tachometer 60 is a typical device that senses the number of rotations of, for example, a rotor over a period of time, also mounted on the tail fin 50 and is operatively associated with the tail rotor 55 to sense the (revolutions per minute) RPM's of the tail rotor 55. Tachometers are well known and commonly used in the aircraft industry, and one of ordinary skill in the art would be able to select an appropriate tachometer for use in the present example. While the helicopter 10 in this example utilizes a tachometer 60 to sense the RPM's of the tail rotor 55, any sensing devices known in the art capable of sensing the RPM's of the tail rotor 55 may be used and such data readily compared to the RPM's of the main rotor (also, being monitored by a tachometer, for example) and thereby monitor the two rotors as to whether they are operating within acceptable comparable RPM's for normal operation.

A deployable deflector 65, in this example, is pivotally connected to a side of the tail portion 35 of the fuselage 15. Deflector 65 may be a portion of fuselage 15 or may be a structure separate from fuselage 15. The deflector 65 may be made from standard aircraft materials such as aluminum or composite material such as carbon fiber or the like and is properly reinforced. A deflector lock 67 on the tail portion 35 of the fuselage 15 adjacent the deflector 65 engages the deflector 65 and locks it in a closed position in which the deflector 65 is positioned closely adjacent to or is positioned flush with the side of the tail portion 35 of the fuselage 15.

Figure 2:
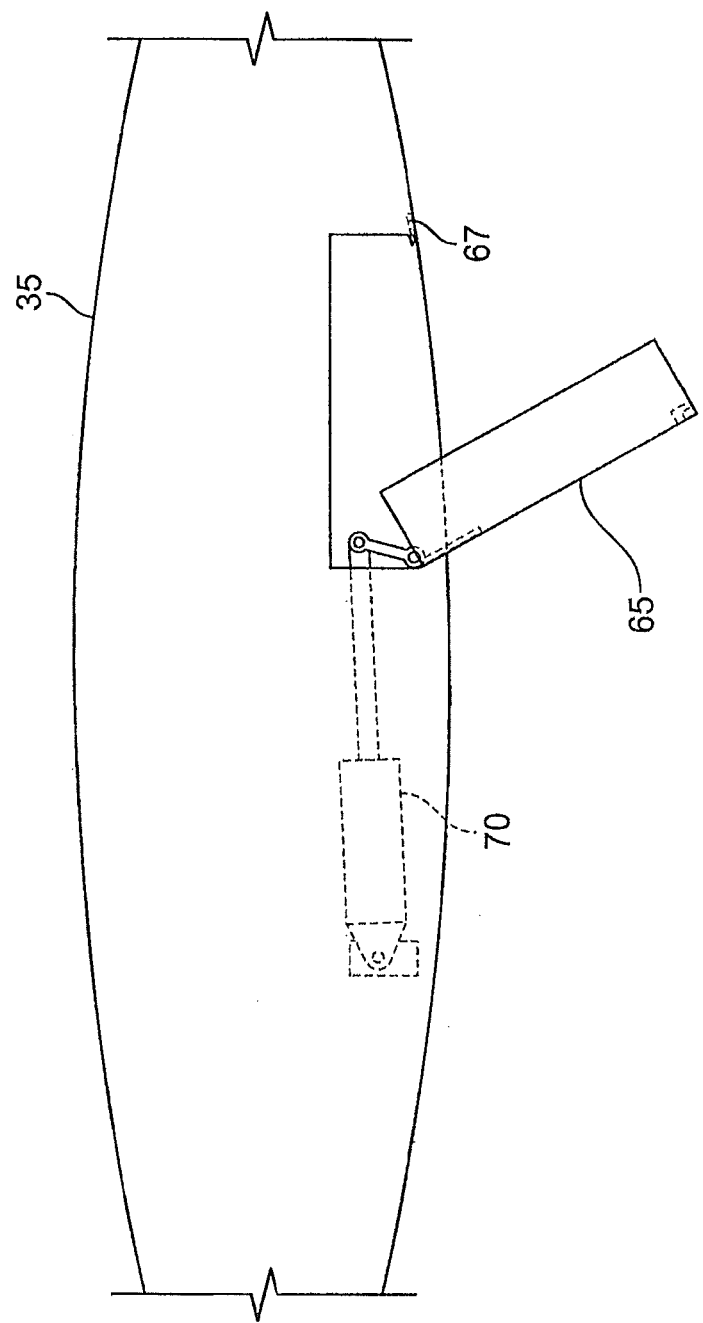
FIG. 2 is a partially cut away top view of the helicopter of FIG. 1.
Figure 3:
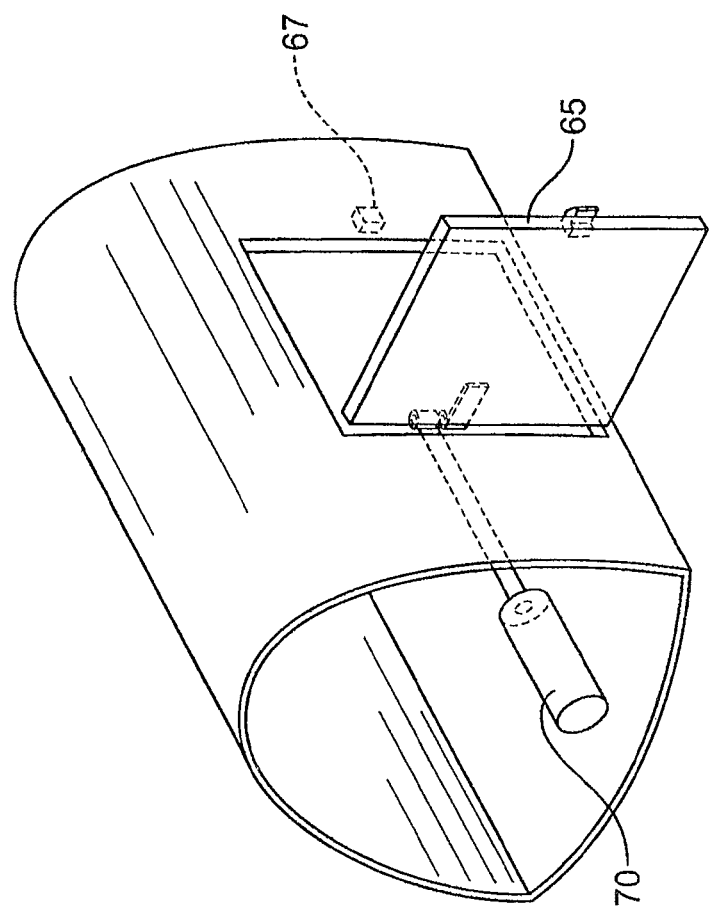
FIG. 3 is a partial cutaway perspective view of the helicopter of FIG. 1 along with an embodiment of a drag resistant deployment device.

The deflector 65 is operatively associated with an actuator 70 for deploying of deflector 65 such that at least of portion of the deflector 65 is positioned spaced apart from the body of the helicopter to engage the airflow and provide torque resistance. In the example shown, deflector 65 is hinged to the body of the helicopter such that deflector 65 rotates outwardly in a direction away from the body of the helicopter into a deployed position to provide torque resistance. The actuator 70, for example, can be hydraulic or electric and of the type commonly used in the aircraft industry. The actuator 70 and the deflector lock 67 are operatively associated with the tachometer 60 such that when the tachometer 60 senses a loss of RPM's in the tail rotor 55 below its acceptable RPM's for normal operation, the deflector lock 67 is released and the actuator 70 is automatically activated thereby deploying the deflector 65 to a position transverse to a longitudinal axis of the tail portion 35 of the fuselage 15, shown in FIGS. 2 and 3. The actuator 70 may also deploy the deflector 65 when a signal from the tachometer 60 is lost altogether, for example if the tail rotor 55 is shot off of the helicopter 10.

As the helicopter 10 travels forward at a normal cruising speed, sufficient drag is created by the deflector 65 to counteract the torque created by the rotation of the main rotor 45, enough to allow an operator to maintain its heading and provide yaw control. For instance, if the helicopter 10 is traveling at 120 MPH, a deflector 65 having a surface area of one square foot deployed to a 90 degree angle relative to the fuselage 15 will create a drag force of approximately 1586 lbs/sf to counteract the torque created by the rotation of the main rotor 45. Drag may also be created when the helicopter 10 is hovering and loses thrust created by the tail rotor 55 due to, among other things, failure of the tail rotor 55 or loss of the tail rotor 55 entirely. In such instances, the helicopter 10 will be caused to spin in a direction opposite the rotation of the main rotor 45 as there is no longer a counteracting thrust generated by the tail rotor 55. The rotation of the helicopter 10 will create airflow over the deflector 65 thereby creating drag, which will counteract at least some of the torque created by the rotation of the main rotor 45.

Figure 4:
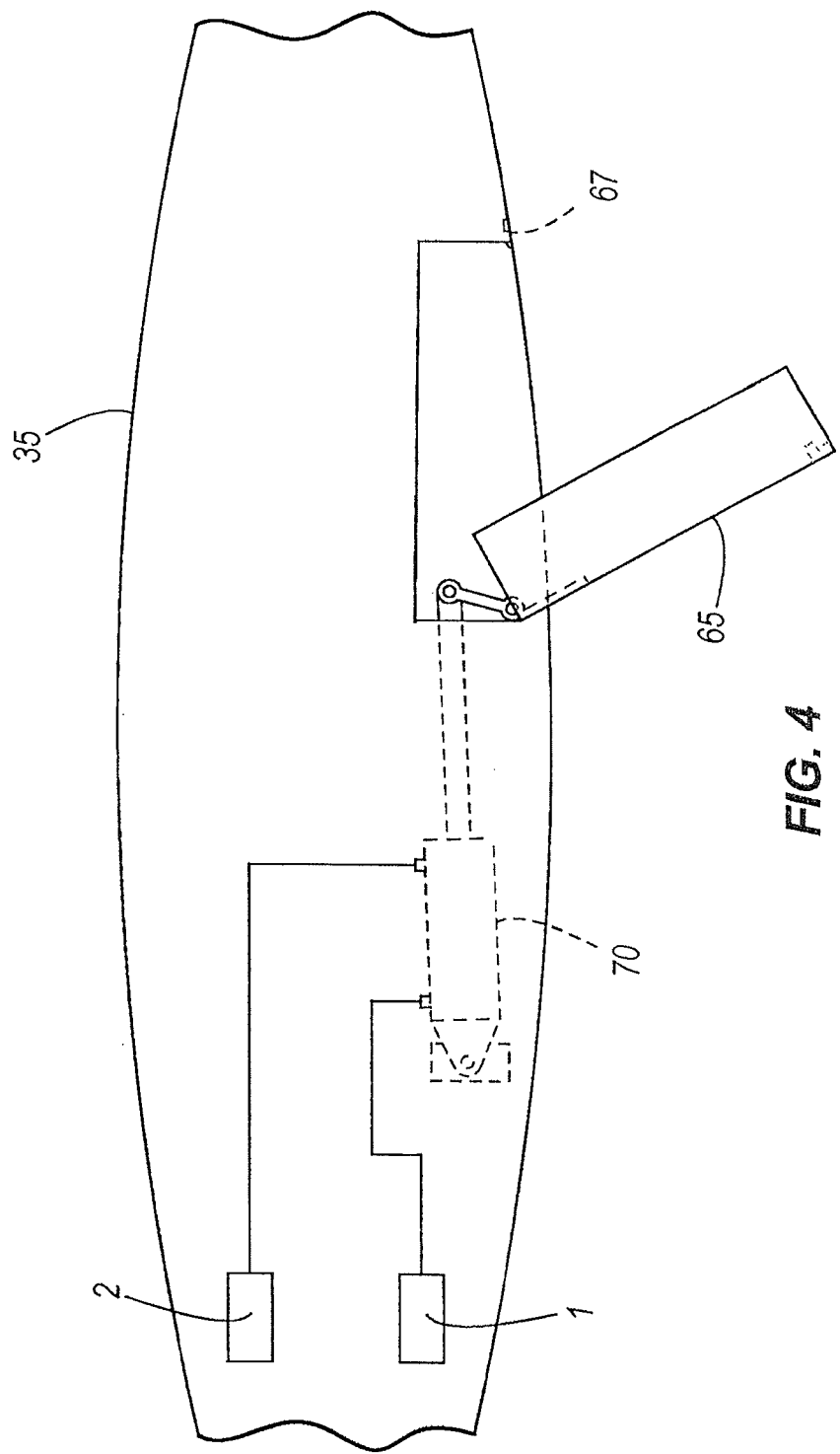
FIG. 4 is a partially cut away top view of the helicopter of FIG. 1 providing a schematic view of pedals and their linkage to the actuator.

The initial position of the deflector 65 on deployment can be predetermined by a manufacturer or may automatically be controlled by an airspeed indicator, increasing or decreasing the angle of the deflector 65 based on the airspeed of the helicopter 10. The initial deployment of the deflector 65 will immediately start to correct helicopter yaw. After emergency yaw recovery, the position of the deflector 65 may be fine tuned to control yaw. For instance, in the present example, the actuator 70 is also operatively associated with the collective control or cyclic control (not shown) of the helicopter 10. This allows the pilot to trim and fine tune yaw control by adjusting the angle of the deflector 65 with respect to the tail portion 35 of the fuselage 15 following the automatic correction of yaw upon the failure of the tail rotor 55. Manual control can also be initiated by rudder pedals interlinked to the actuator 70, as seen in the embodiment shown in FIG. 4. In FIG. 4, left and right pedals 1 and 2, respectively, are typically used by the pilot to control the pitch of tail rotor 55 in normal flight; however, pedals 1 and 2 can be switched over and be used to control actuator 70, upon tail rotor 55 failure. Pedals 1 and 2, in this embodiment, are linked to actuator 70 such that operation of pedals 1 and 2 by the pilot controls deployment of deflector 65. The linkage and control of the operation actuator 70 are commonly known for operation of controls on an aircraft, such as for example, hydraulic or electrical or combination thereof. Thus with tail rotor 55 not able to counter torque production of main rotor 45, fuselage 15 begins to rotate in a clockwise direction. The pilot can depress left pedal 1 thereby activating actuator 70 to push deflector 65 outwardly away from the fuselage 15 to create drag and provide a counter force to the clockwise rotation of the fuselage 15. Use of left and right pedals 1 and 2 can be employed by the pilot to appropriately trim the deployment of deflector 65 to create sufficient drag to, in turn, trim fuselage 15 into a desired stable orientation. While the actuator 70 in this example is activated by the tachometer 60, it is understood that the actuator 70 may also be operatively associated with a directional gyro heading indicator, an autopilot or any other Nav Aid such that a failure in the tail rotor 55 is acknowledged and the deflector 65 is deployed.

The foregoing description of the various embodiments of the invention have been presented for purposes of illustration and description, and is not intended to be exhaustive or to limit the invention to the precise form disclosed. The description was selected to best explain the principles of the invention and its practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A torque resisting system for a helicopter which comprises a body, main rotor and a tail rotor, the system comprising:
    a deflector connected to an actuator for moving the deflector relative to the body, wherein the body comprises opposing lateral sides wherein only one lateral side of the opposing lateral sides is associated with the deflector such that the deflector is moveable to a position to extend away from the only one lateral side in a direction non-parallel to a longitudinal axis of the helicopter creating an imbalance of drag force on the helicopter between the only one of the lateral side compared to another lateral side of the opposing lateral sides, with the helicopter in motion; and
    a sensor operationally associated with the tail rotor and the actuator; wherein
    the actuator moves the deflector upon: receiving a signal indicating that the tail rotor is operating below a predetermined number of rotations for a given time period or sensing a loss of a signal from the sensor.

2. The torque resisting system for a helicopter of claim 1 wherein the sensor comprises a tachometer.

* * * * *